United States Patent [19]

Ellis

[11] Patent Number: 4,589,832

[45] Date of Patent: May 20, 1986

[54] BRIQUETTE MAKING MACHINE

[75] Inventor: Kenneth R. Ellis, Thetford, United Kingdom

[73] Assignee: Thetford International Products, Ltd., United Kingdom

[21] Appl. No.: 705,798

[22] Filed: Feb. 26, 1985

[51] Int. Cl.[4] ............................................. B29C 17/00

[52] U.S. Cl. ................................ 425/289; 425/324.1; 425/256; 425/292; 425/296; 425/302.1; 425/305.1

[58] Field of Search ............... 425/237, 256, 289, 292, 425/296, 298, 302.1, 303, 305.1, 324.1, 325; 264/118

[56] References Cited

U.S. PATENT DOCUMENTS

| | | | |
|---|---|---|---|
| 2,638,066 | 5/1953 | Ridder | 425/289 X |
| 3,115,103 | 12/1963 | Huss | 425/324.1 |
| 3,266,096 | 8/1966 | Thomas et al. | 425/256 X |
| 3,504,067 | 3/1970 | Trecek | 425/305.1 X |
| 3,549,738 | 12/1970 | Troyer | 264/118 |
| 4,011,035 | 3/1977 | Root | 425/289 X |
| 4,401,610 | 8/1983 | Öhberg | 264/118 X |

FOREIGN PATENT DOCUMENTS

| | | | |
|---|---|---|---|
| 276521 | 10/1951 | Switzerland | 425/237 |

*Primary Examiner*—J. Howard Flint, Jr.
*Attorney, Agent, or Firm*—Neal J. Mosely

[57] ABSTRACT

The briquette making machine comprises a waste-receiving bin (11), one wall of which is defined by a plate (12) to sweep waste towards a guillotine (15) forming another wall of the bin (11). The guillotine (15) comprises a blade portion (19) to shear any waste straddling the bin and a compression chamber defined by the blade portion (19) and a wall (17). With the guillotine (15) in its most downward position a piston (23) configured to conform to the cross-sectional shape of the compression chamber clears the compressed waste therefrom by further compressing it against and eventually through a constricted discharge opening. The opening is defined by wheels (25, 26) which longitudinally groove the emergent briquette.

In a preferred embodiment, the guillotine (15) and the piston (23) are advanced and retracted by first and second double-acting hydraulic rams (respectively 9 and 23, 24). There is a third ram (27) holding one (26) of the wheels against the emergent briquette. The hydraulic circuitry (FIG. 5) is so arranged that as the ram (9) raises the guillotine, the hydraulic fluid which exhausts automatically from that ram is transferred to the second ram (23, 24) to retract the piston (23) substantially simultaneously with the retracting movement of the guillotine (15). With the guillotine (15) at the limit of its retracting movement, the circuitry automatically feeds hydraulic fluid to the piston ram (23, 24) to hold the piston (23) in its fully retracted position as the guillotine (15) subsequently descends. The third ram (27) is pressurized against the briquette by hydraulic fluid which enters that ram under pressure automatically as the fluid is exhausting from the ram (9) which is retracting the guillotine.

10 Claims, 5 Drawing Figures

BRIQUETTE MAKING MACHINE

FIELD OF THE INVENTION

The invention relates to machines for making compressed fuel briquettes from waste cardboard and similar material.

REVIEW OF THE PRIOR ART

Methods of making briquettes from waste cardboard and other material, by extruding material through a constriction aperture, are known from inter alia the following patents which constitute the most relevant prior art currently known to the applicant:

Swedish 105 654; 395 432.

German 2 359 450; 912 167; 1 752 111; 1 139 743; 1 806 209; 1 402 382; 1 239 930.

United Kingdom 666 024; 761 227; 765 483; 1 260 175; 2 107 239.

SUMMARY OF THE INVENTION

In a briquette-making machine embodying the present invention, a power-driven plate sweeps the waste from the bin towards and at least partly into the initially open breach of a compression chamber; a power-driven waste-shearing guillotine progressively closes off the breach and compresses the material within the compression chamber; a power-driven piston moves at an angle, preferably a right-angle, to the guillotine to clear the compressed waste from the compression chamber and compress it against and eventually through a constricted discharge orifice; and the discharge orifice is so configured as to groove the emergent briquette longitudinally.

By so grooving the briquette the compressed layered material of the briquette is held together longer and does not too readily break apart into flakes as it comes off the machine. Both these features are of decisive importance for quiet combustion during its subsequent use as a fuel.

The groove or grooves may be imparted to the briquette surface by ridged wheels, which may themselves define the orifice and which will promote a smoother discharge of compressed material from the orifice.

At least one of theses wheels may be withdrawable, preferably by power-operated means, if the orifice clogs. Such a withdrawable wheel may for example be held against the briquette surface, and automatically allowed to withdraw there from if necessary, by a fluid-filled ram in circuit with a fluid accumulator.

One or more of the wheels just referred to may exhibit a ridge which is generally triangular in cross-section and whose apex is radiused. This counteracts the natural tendency of the emergent briquette to curl up and back on itself as it comes off the grooving means.

Advantageously the grooving wheel may be a composite wheel whose ridge is of harder material than the main body of the wheel. The expense of the harder material is thereby minimised without detracting from the efficacy of the wheel.

Advantageously the groove may be imparted to the top surface of the emergent briquette and an elongate spring bar may press into and along that groove, to resist the tendency of the briquette to curl up and back on itself once discharged.

A lip may advantageously be provided, on the side of the guillotine facing the sweep plate, to positively push the waste further into the bin as the guillotine moves to close off the breach of the compression chamber.

Advantageously the bin is paralled-sided and open-topped, for more efficient delivery of the incoming waste to the compression chamber.

The guillotine and sweep plate may be combined in one power-driven plate, or alternatively they may be constituted by separately driven plates.

In a further feature of a machine of the kind in question, the guillotine is raised and lowered by a double-acting hydraulic ram; another double-acting hydraulic ram advances and retracts the compressing piston; and a common hydraulic circuitry links these rams in such a way that, as the guillotine-lifting ram raises the guillotine, the oil which exhausts from that ram is automatically transferred to the ram which drives the waste-compressing piston and moves that piston back from the compressing chamber breach so that the piston retracts substantially simultaneously with the upward movement of the guillotine.

The use of hydraulic rams gives an altogether smoother and more truly incremental action through all the main moving parts of the machine than does the use of rack and pinion drives or equivalent mechanical means. It also makes it possible for a single motor and twin-pump unit to drive both rams. If the guillotine or the waste-compressing piston jams in its movement, a hydraulic relief valve can blow and prevent damage. With a mechanically driven machine, by contrast, damage would be inevitable in such a situation.

Preferably, in a machine of the kind in question, the hydraulic circuitry is such that the guillotine reaches the top of its upward movement before the waste-compression piston has moved fully back from the compression chamber breach, and oil then continues to be fed automatically to the ram retracting the waste-compressing piston and subsequently holds the piston in its fully retracted position as the guillotine subsequently descends again.

Where, in a machine of the kind in question, the discharge orifice is at least partially defined by one or more ridged wheels held against the surface of the emergent briquette by power operated means, the power operated means advantageously also comprise a hydraulic ram and this ram is pressurised against the briquette by oil which enters the ram under pressure automatically as the oil is exhausting from the ram which is raising the guillotine.

In all these respects the present invention provides a machine which constitutes a novel and non-obvious advance over the known art reviewed above.

BRIEF DESCRIPTION OF THE DRAWINGS

The machine and modification thereof shown in the accompanying drawings, are currently the best ways known to the applicant of putting the invention into practice. In these drawings.

DESCRIPTION OF THE PREFERRED EMBODIMENT

Figure 1:
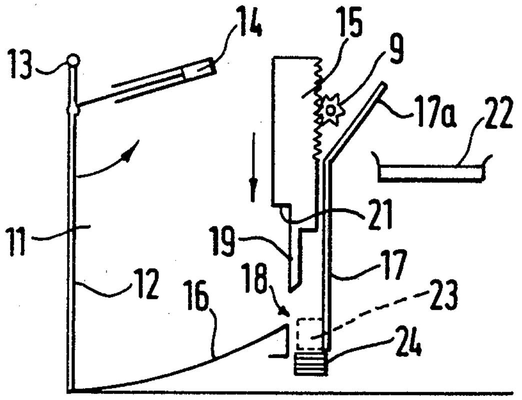
FIG. 1 shows the machine in diagrammatic side elevation.

A waste receiving bin 11 is parallel-sided and open-topped. A sweep plate 12 forms one side wall of the bin, and is pivoted to the bin about a top hinge 13. Fluid filled rams 14, only one of which is shown in the drawings, move the sweep plate 12 about its hinges 13 towards and away from a guillotine which is referenced generally 15 and one of whose faces forms, in use, a side wall of the bin 11 opposite to that formed by the plate 12.

An arcuate base plate 16 defines the bottom of the bin 11. The plate 12 sweeps to and fro along the arcuate base plate 16 as the rams 14 respectively retract and extend.

A plate 17 is fixed to the main framework of the machine, behind the guillotine 15, and forms one wall of a compression chamber. The guillotine 15, as it descends, closes off the breach 18 of the compression chamber and defines the other wall of that chamber. The bottom portion 19 of the guillotine 15 is configured as a blade which will shear the cardboard or other waste material swept at least partly into the breach 18 by the plate 12 in use.

The guillotine 15 is driven by a rack and pinion drive indicated generally at 9. The drive is powered by a motor and gearbox unit which can be of proprietary kind and readily be selected by the intended skilled addressee of this specification. It is neither described nor illustrated here.

A lip 21, on the side of the guillotine 15 which faces the sweep plate 12, acts to push the waste down into the bin as the guillotine descends.

The end of the arcuate plate 16 against which the guillotine blade 19 closes off the compression chamber breach 18, defines a tangent of approximately 45° with a notional horizontal line.

The top 17*a* of the plate wall 17 is bent backwards at an angle to the main body of the plate, as FIG. 1 shows. A chute 22 is fixed to the main frame of the machine below this bent out portion 17*a*. Any cardboard or other waste material escaping up the side of the plate 17 and being discharged over the end of the bent out portion 17*a* will fall on to the chute 22. The chute slopes down towards an access door (not illustrated) which can periodically be opened to empty any material caught by the chute 22.

A power-driven piston 23 in the form of an elongate solid square section bar is toothed on its underside. A pinion 24 drives the toothed bar 23 into and out of the compression chamber defined by the plate wall 17 and guillotine blade 19. The bar 23 moves under its rack and pinion drive at right angles to the movement of the guillotine 15. In this particular machine, the guillotine 15 moves vertically up-and-down whilst the power-driven bar 23 moves horizontally back and forth.

The bar 23 is driven by a motor and gear box unit similar to that used to drive the guillotine rack and pinion drive 9.

The unit can again be selected from known alternatives, and is neither described or illustrated herein.

In use, cardboard waste is dropped into the open-topped parallel-sided bin 11, and is swept by the plate 12 towards and at least partly into the breach 18 of the compression chamber. Initially the guillotine 15 is in its raised position to open the breach. The guillotine then descends, shearing through any cardboard waste which straddles the breach, and closing off the breach whilst simultaneously and progressively compressing the cardboard waste in the chamber defined between the guillotine blade 19 and the plate wall 17.

Figure 2:
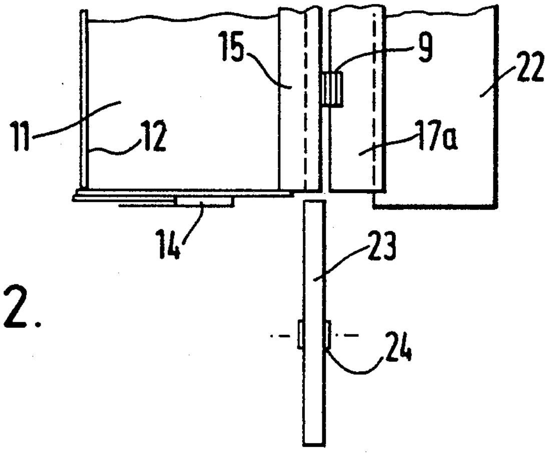
FIG. 2 shows parts of the machine of FIG. 1 in plan.

Throughout this operation, the bar 23 is in its retracted position illustrated in FIG. 2.

With the guillotine driven fully down, and held there, the bar 23 is then driven forward into the compression chamber to compress the already compressed waste in a direction at right-angles to that in which the guillotine compressed it. The bar 23 continues to drive forward and effectively clears the twice-compressed waste from the compression chamber to compress it against and eventually through a constricted discharge orifice.

Figure 4:
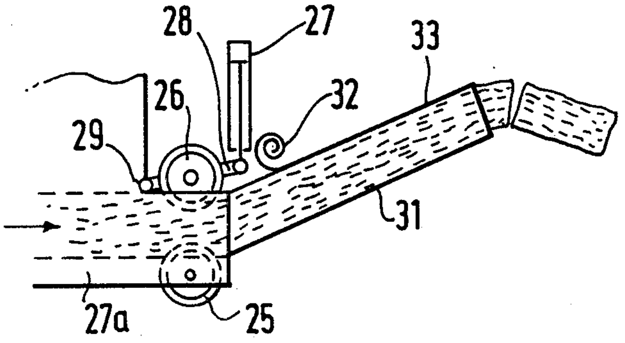
FIG. 4 shows the discharge end when viewed from the side.
Figure 3:
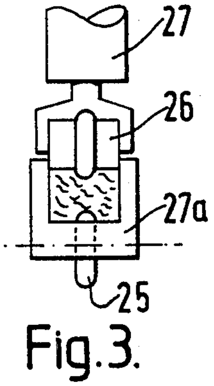
FIG. 3 is a detailed view of the discharge end of the machine.

As FIGS. 3 and 4 show, the orifice is defined by respective top and bottom wheels 25, 26. Each of these wheels is freely rotatable abouts its own respective axis which runs horizontally.

The bottom wheel 25 is fixed in the discharge channel 27*a* of the machine which leads out of and forms an extension of the base and the side walls of the compression chamber. The top wheel 26 is carried by a fluid-filled ram 27 which is in circuit with a fluid accumulator (not shown).

Both wheels 25, 26 exhibit ridges which are triangular when viewed end-on, ie. as in FIG. 3. The ridged portion of the top wheel 26 is made of harder material than the rest of the wheel.

In both wheels, the apex of the triangular section ridged portion is radiused.

As FIG. 4 shows, the ram 27 is pivoted between the main frame of the machine and one end of a fork 28 which supports the wheel 26 and which is pivoted at its other end (29) to the main frame of the machine. The ram 27 swings the fork 28, and hence the wheel 26, about the pivot 29 in response to an automatically sensed pressure of material between the wheels 25, 26. If the discharge orifice is about to clog, the ram 27 will automatically withdraw the sweep 26 and will repeat that operation several times if necessary to allow the blockage to clear itself.

If the discharge orifice remains clogged, even after several withdrawals and repositionings of the wheel 26, the whole machine simply switches off; the ram 27 withdraws the wheel 26 completely; and the discharge orifice has to be cleared manually before the machine can be re-set and re-started.

As the compressed and continuous briquette strand comes through the discharge orifice, the wheels 25, 26 impart grooves to each of its top and bottom surfaces. These grooves help to lock the compressed material together. The imparting of these grooves gives to the material an inherent tendency to curl up and back on itself as it emerges from the orifice. A discharge channel 31 is fixed upwardly to rise from the discharge orifice, to accommodate this tendency to a certain extent.

A torsion spring 32 is fixed to the top of the discharge channel 31, and has an elongate spring bar extension 33 which is relatively heavily spring-loaded towards the base of the channel 31. In use, the spring bar 33 presses into and along the groove in the top surface of the emergent briquette, and keeps it in the channel.

As the briquette emerges finally from the end of the discharge channel 33, its own projecting weight tends to break it off into individual briquettes of relatively short length.

Various practical features are incorporated into the machine described and illustrated, to ensure its automatic and safe operation. For example, limit switches allow the bar 23 to withdraw completely from the compression chamber (ie. as illustrated in FIG. 2) but prevent it from being driven so far back that it comes out of its bearing. Sensors may restrict the sweep of the plate 12 if the rams 14 encounter too much resistance from material in the bin 11. These and other practical details can be settled without inventive thought by the skilled reader.

Figure 5:
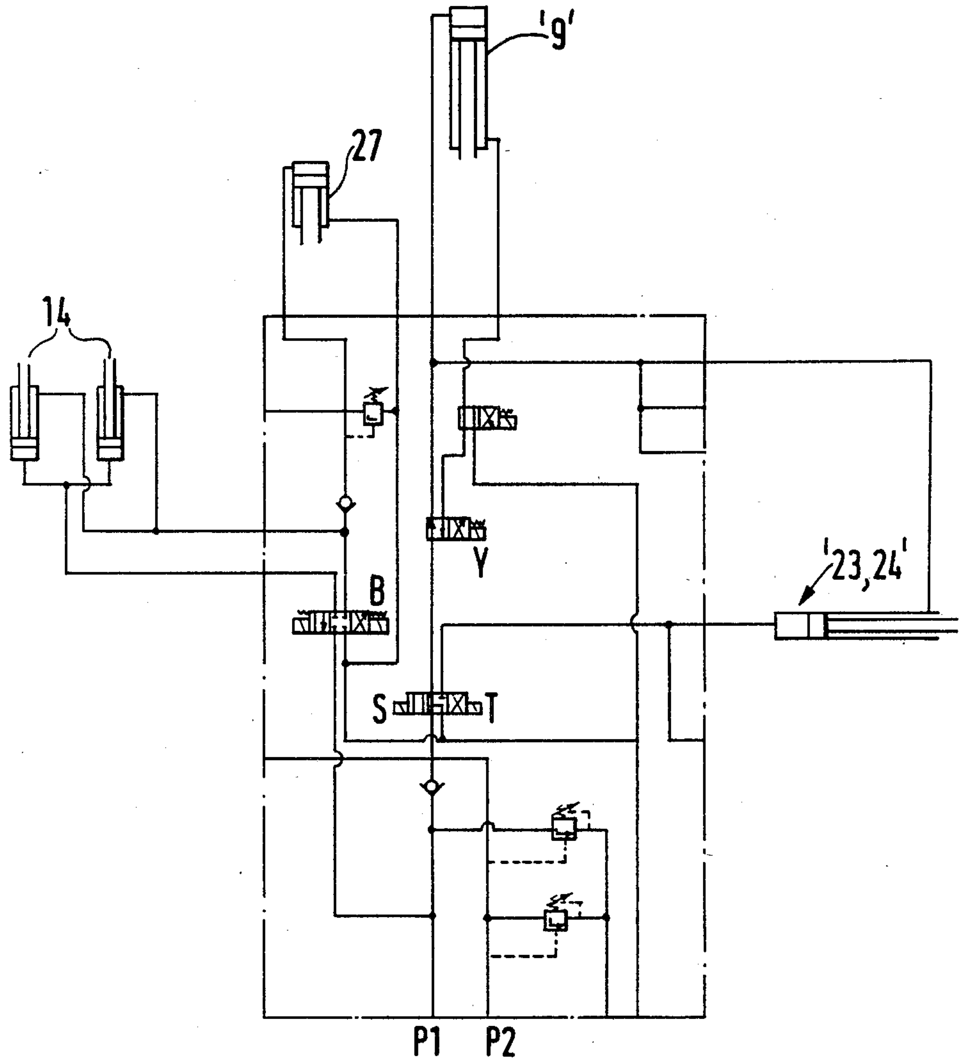
FIG. 5 shows the hydraulic circuit diagram of the modified machine.

The machine illustrated is of course only one example, although currently the preferred example, of putting the invention into practice. It could be modified within the scope of the invention. For instance, the rack and pinion drives to the guillotine 15 and power-driven piston bar 23 could both be replaced by fluid driven rams, and such a modification will now be described with reference to FIG. 5.

Rams 14 swing the plate towards and away from the compression chamber of the machine and are the direct equivalent of the similarly referenced rams 14 shown in the drawings of FIGS. 1 to 4. Another ram 27 presses a ridged wheel against the surface of the emergent briquette and is a functional equivalent of the ram similarly referenced 27 in FIGS. 1 to 4. With two important exceptions, to be described below, the rest of the machine is essentially equivalent in construction and function to the machine described and illustrated in FIGS. 1 to 4.

The two exceptions are the power driven means which raise and lower the guillotine and which advance and retract the waste-compressing piston. A single large double-acting hydraulic ram shown in the accompanying drawing is a functional equivalent of the rack and pinion drive 9 of the machine of FIGS. 1 to 4. It raises and lowers the guillotine of the machine. A similarly double-acting hydraulic ram replaces the rack and pinion drive 23, 24 of the previous machine to advance and retract the waste-compressing piston (referenced 23 in the previously described and illustrated machine). The hydraulic circuit illustrated operates as follows.

Oil is fed under pressure from pumps P1 and P2 via solenoids S and Y to cause ram '9' to retract and hence to raise the guillotine. As the guillotine rises, the oil automatically exhausted from the upper end of ram '9' is supplied under pressure via solenoid Y to cause ram '23, 24' to retract and hence to move the waste-compressing piston back from the compression chamber breach.

As the guillotine rises, and oil automatically exhausts from the top end of ram '9', rams 14 are pressurised via solenoid B to swing the sweep plate towards the compression chamber breach.

At the same time, ram 27 again is pressurised to press grooved roller 26 (not illustrated here) against the surface of the emergent briquette.

The guillotine reaches the top of its upward movement shortly before the simultaneously-retracting waste-compressing piston reaches the limit of its backward movement. With the piston in that back-limit position, it is held there under pressure, whilst oil is now supplied via solenoid S into the top of ram '9' to move the guillotine downwards thus progressively closing off the breach of the compression chamber and shearing any waste straddling the breach.

When the guillotine has reached the bottom limit of its downward movement, oil is now supplied under pressure via solenoid T to ram '23, 24' and the previously-pressurised oil is allowed to exhaust automatically from the other end of the ram cylinder so that the ram extends to move the waste-compressing piston into and through the compression chamber breach and hence to compress and eject the waste material in briquette form through the discharge orifice of the machine.

We claim:

1. A machine for making briquettes from waste, including a waste-receiving bin;

a compression chamber adjacent to said waste receiving bin;

plate means to sweep said waste from the bin towards and at least partly into the initially open breach of said compression chamber;

power-driven guillotine means movable progressively to close off the initially open breach, to shear waste straddling said breach and to compress waste within said compression chamber;

power-driven piston means movable transversely to the guillotine means to clear the compressed waste from said compression chamber and further compress it;

a constricted discharge orifice against which the waste is further compressed and through which the further compressed waste eventually passes;

and grooving means forming a part of said constricted discharge orifice;

said grooving means being configured to groove longitudinally the emergent briquette.

2. A machine for making briquettes according to claim 1, in which said grooving means comprises a wheel.

3. A machine for making briquettes according to claim 2, in which the wheel is a ridged wheel.

4. A machine for making briquettes according to claim 3, in which said ridged wheel includes a ridge which is generally triangular in cross-section and the apex of which is radiused.

5. A machine for making briquettes according to claim 3, in which said ridged wheel is of composite construction and the ridge is of harder material than the main body of the wheel.

6. A machine according to claim 1 and further characterised by first double-acting hydraulic ram means having a first chamber and a second chamber and power-driving said guillotine means; second double-acting hydraulic ram means having a first chamber and a second chamber and power-driving said piston means; hydraulic circuitry operatively linking said first and second ram means; and valve means within said circuitry to cause hydraulic fluid, exhausted automatically from one of said first and second chambers of said first ram means as said first ram means retracts said guillotine means from said breach, to enter a respective one of said first and second chambers of said second ram means and retract said piston means from said breach, whereby said guillotine means and said piston means retract substantially simultaneously.

7. A machine according to claim 6 and wherein said hydraulic circuitry including said valve means is so arranged as to cause said guillotine means to reach the limit of its retracting movement before said piston means has reached the limit of its own retracting movement, and is further so arranged as to cause hydraulic fluid to continue to be fed automatically to said second ram means and to hold said piston means at the limit of its retracting movement whilst said first ram means subsequently drives said guillotine means again towards said breach.

8. A machine according to claim 6 and further characterised by third hydraulic ram means holding said grooving means against said emergent briquette, and wherein said hydraulic circuitry including said valve means causes hydraulic fluid to enter said third ram means as said fluid exhausts automatically from said one of said first and second chambers of said first ram means as said first ram means retracts said guillotine means from said breach.

9. A machine according to claim 8 and further characterised by a fluid accumulator in hydraulic circuit with said third ram means.

10. A machine according to claim 1 and further characterised by an elongate spring bar means and by means locating said spring bar means adjacent the discharge side of said constricted discharge orifice, whereby said spring bar means presses into and along the longitudinal groove produced in said emergent briquette by said grooving means.

* * * * *